(12) United States Patent
Tamura et al.

(10) Patent No.: US 12,330,297 B2
(45) Date of Patent: Jun. 17, 2025

(54) ROBOT

(71) Applicant: SEIKO EPSON CORPORATION, Tokyo (JP)

(72) Inventors: Yosaku Tamura, Azumino (JP); Takayuki Nakamura, Shiojiri (JP); Kazuhisa Yano, Shiojiri (JP); Yuta Ichimiya, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/517,491

(22) Filed: Nov. 22, 2023

(65) Prior Publication Data

US 2024/0173849 A1 May 30, 2024

(30) Foreign Application Priority Data

Nov. 24, 2022 (JP) ................................. 2022-187720

(51) Int. Cl.
*B25J 9/00* (2006.01)
*B25J 9/04* (2006.01)
*B25J 17/00* (2006.01)

(52) U.S. Cl.
CPC ............. *B25J 9/0009* (2013.01); *B25J 9/042* (2013.01); *B25J 17/00* (2013.01)

(58) Field of Classification Search
CPC . B25J 9/0009; B25J 9/042; B25J 17/00; B25J 19/0075; B25J 18/00; B25J 19/00
See application file for complete search history.

(56) References Cited

U.S. PATENT DOCUMENTS

| | | | |
|---|---|---|---|
| 2017/0182669 A1 | 6/2017 | Bordegnoni et al. | |
| 2017/0341223 A1 | 11/2017 | Hahakura et al. | |
| 2024/0173848 A1* | 5/2024 | Ichimiya | B25J 9/0009 |
| 2024/0173849 A1* | 5/2024 | Tamura | B25J 9/0009 |

FOREIGN PATENT DOCUMENTS

| | | |
|---|---|---|
| CN | 202910858 U | 5/2013 |
| JP | 2011-093066 A | 5/2011 |

* cited by examiner

*Primary Examiner* — Victor L MacArthur
(74) *Attorney, Agent, or Firm* — Harness, Dickey & Pierce, P.L.C.

(57) ABSTRACT

A robot includes a base; a first arm rotatably connected to the base around a first rotation axis; and a second arm rotatably connected to the first arm around a second rotation axis parallel to the first rotation axis, wherein the second arm includes an arm base and a cover configured to attach to and detach from the arm base and the cover includes a cover main body that covers an upper portion of the arm base and a covering section that protrudes downward from the cover main body and that covers a portion of a side surface of the arm base.

6 Claims, 8 Drawing Sheets

ROBOT

The present application is based on, and claims priority from JP Application Serial Number 2022-187720, filed Nov. 24, 2022, the disclosure of which is hereby incorporated by reference herein in its entirety.

BACKGROUND

1. Technical Field

The present disclosure relates to a robot.

2. Related Art

A robot described in JP-A-2011-093066 is provided with a base, a first arm rotatably connected to the base around a first rotation axis, a second arm rotatably connected to the first arm around a second rotation axis parallel to the first rotation axis, and a working head supported by the second arm. In addition, the second arm includes an arm base, a joint actuator which is installed on the arm base and is configured by a motor, a decelerator, and the like, and a cover which is detachably and attachably mounted on the arm base. The cover is mounted on the arm base so as to cover the joint actuator and other drive systems installed on the arm base. When the joint actuator and other drive systems installed on the arm base of the second arm are inspected or repaired, an operation of detaching the cover from the arm base is performed.

However, in the robot described in JP-A-2011-093066, it is difficult to recognize the boundary between the arm base and the cover. Therefore, there is a problem in that it is difficult for an operator to recognize which portion should be held when the operator performs the operation of detaching the cover from the arm base, and a detachment operation of the cover cannot be easily performed.

SUMMARY

A robot according to the present disclosure includes a base; a first arm rotatably connected to the base around a first rotation axis; and a second arm rotatably connected to the first arm around a second rotation axis parallel to the first rotation axis, wherein the second arm includes an arm base and a cover configured to attach to and detach from the arm base and the cover includes a cover main body that covers an upper portion of the arm base and a covering section that protrudes downward from the cover main body and that covers a portion of a side surface of the arm base.

DESCRIPTION OF EMBODIMENTS

Hereinafter, a robot according to the present disclosure will be described in detail based on embodiments shown in the accompanying drawings.

First Embodiment

Figure 1:
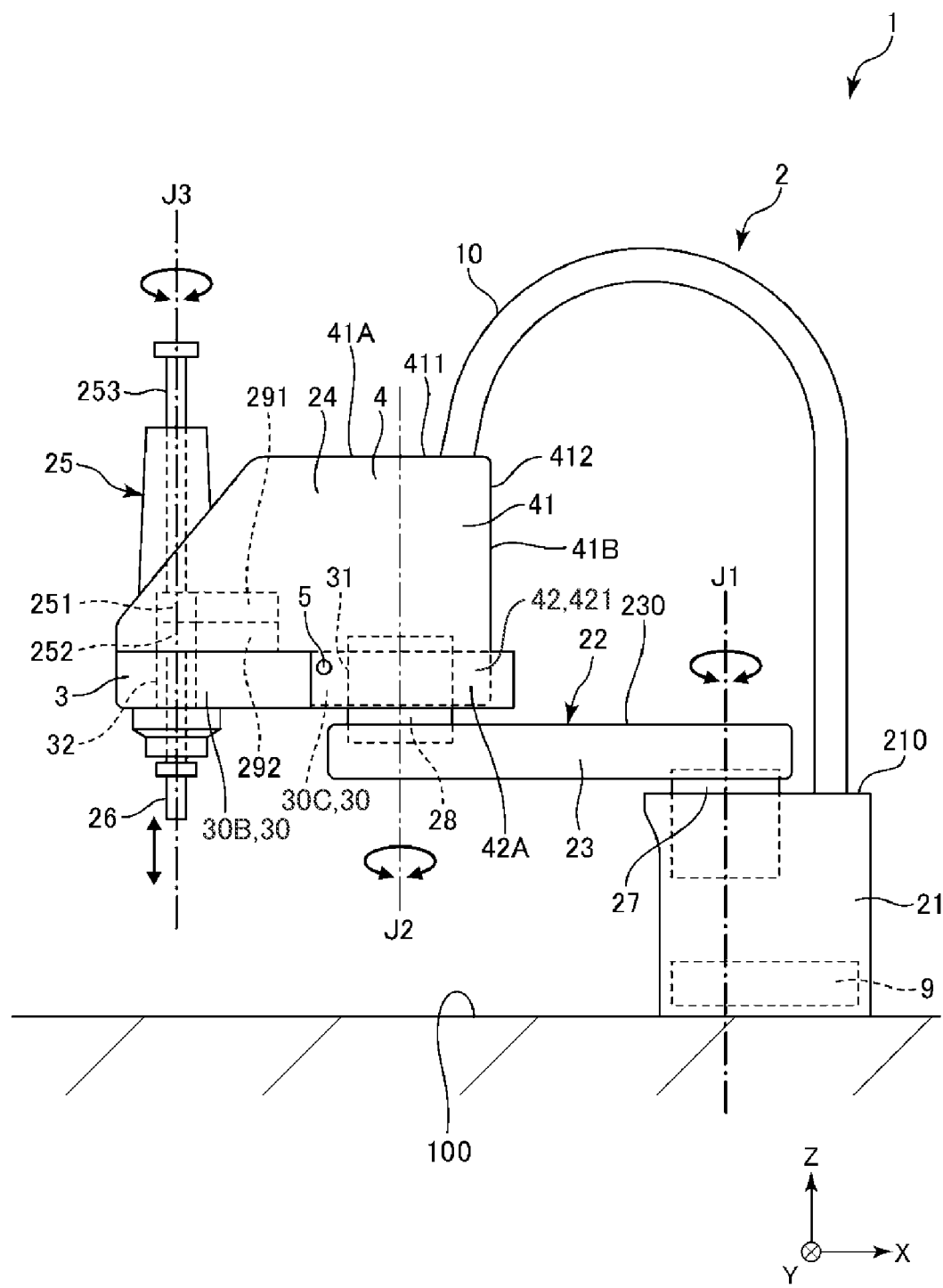
FIG. 1 is an overall view of a robot system according to a first embodiment.
Figure 2:
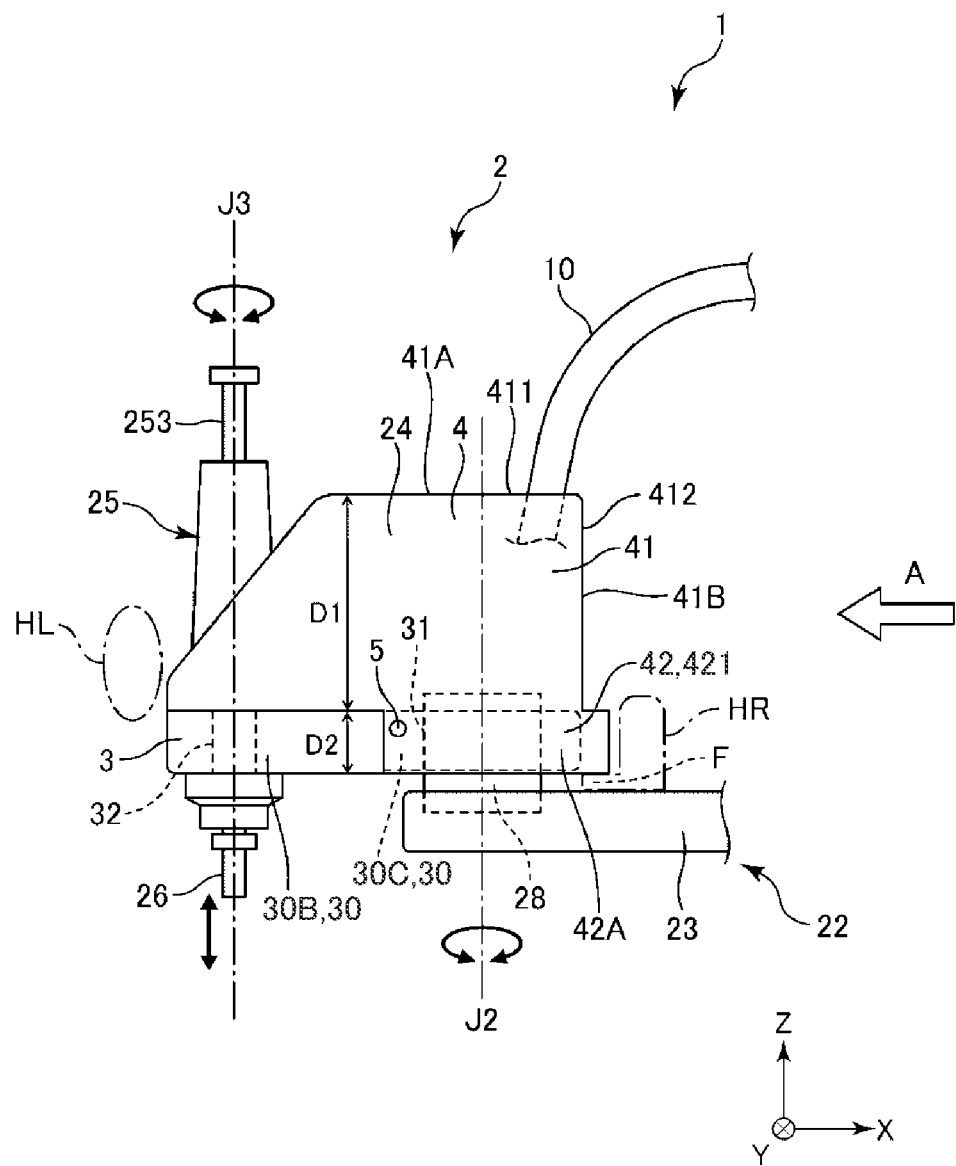
FIG. 2 is a side view of a second arm of a robot shown in FIG. 1.
Figure 3:
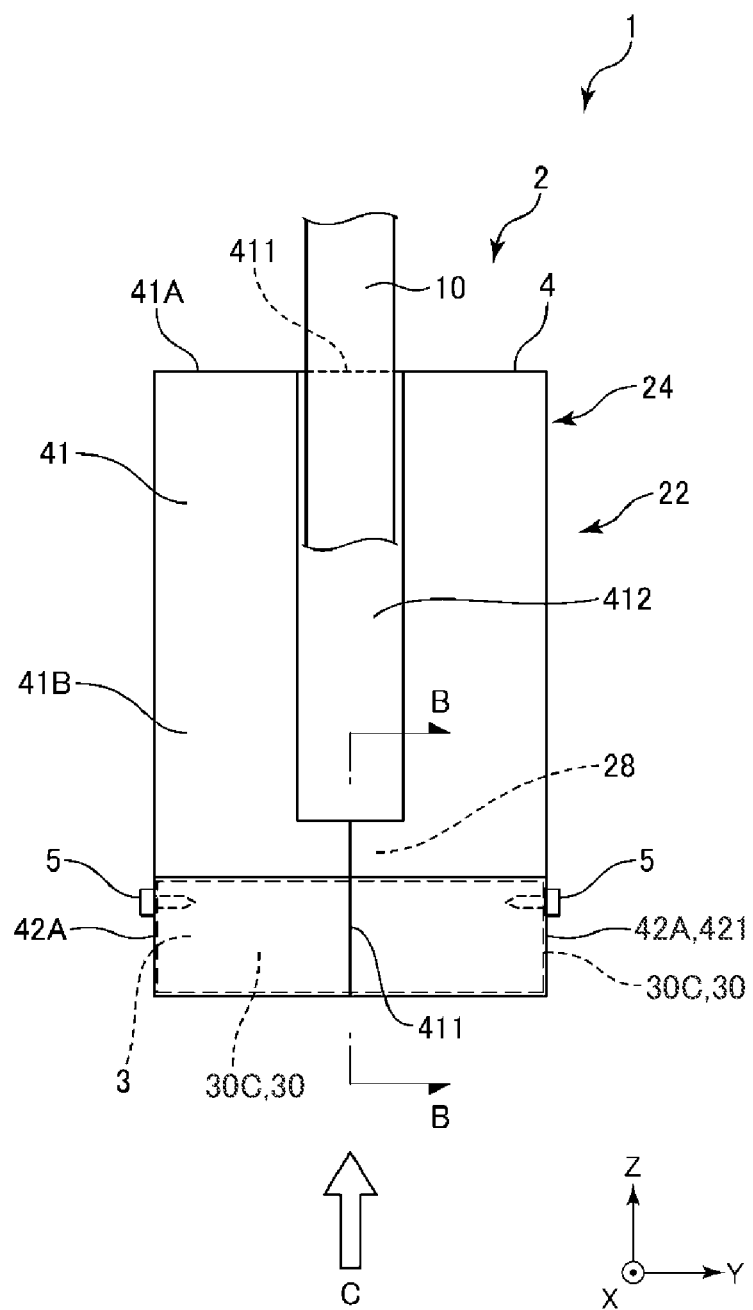
FIG. 3 is a view as viewed from the direction of the arrow A in FIG. 2.
Figure 4:
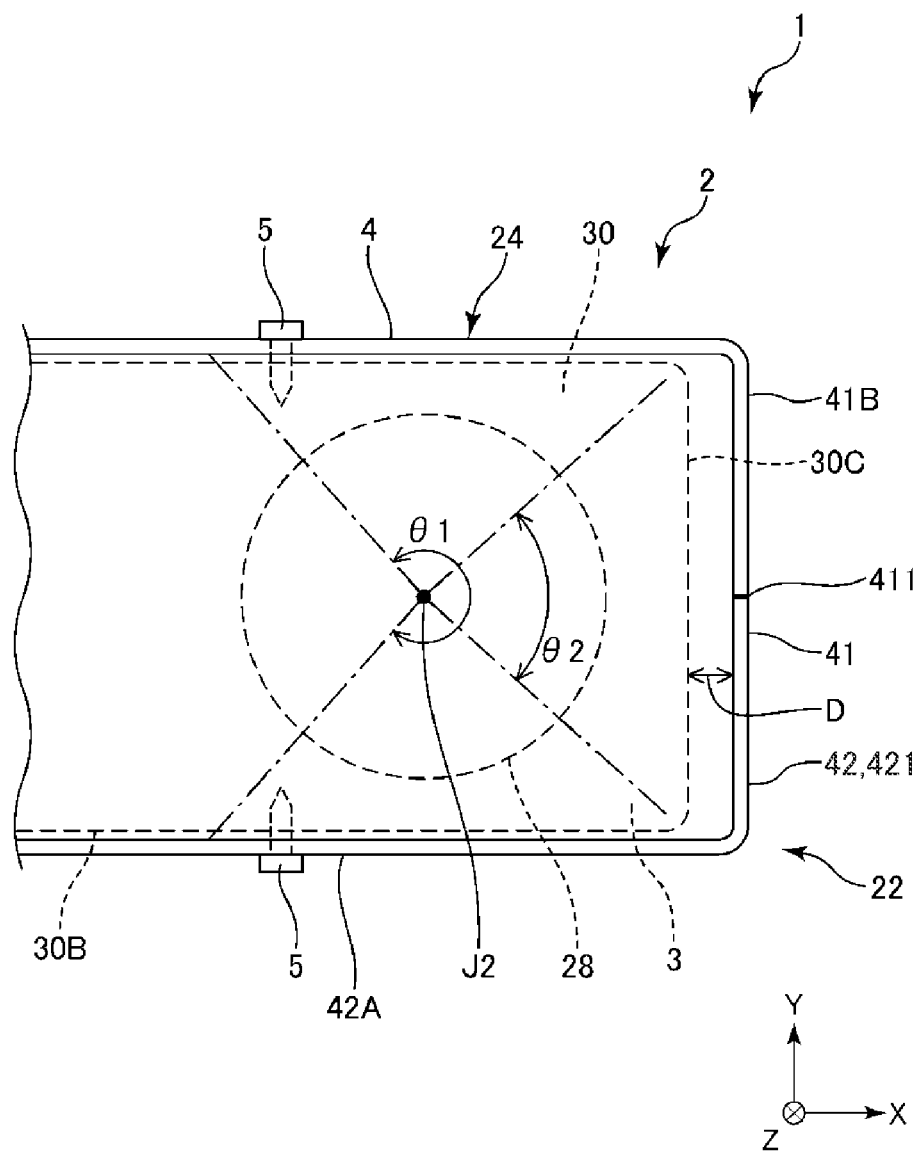
FIG. 4 is a view as viewed from the direction of the arrow C in FIG. 3.
Figure 5:
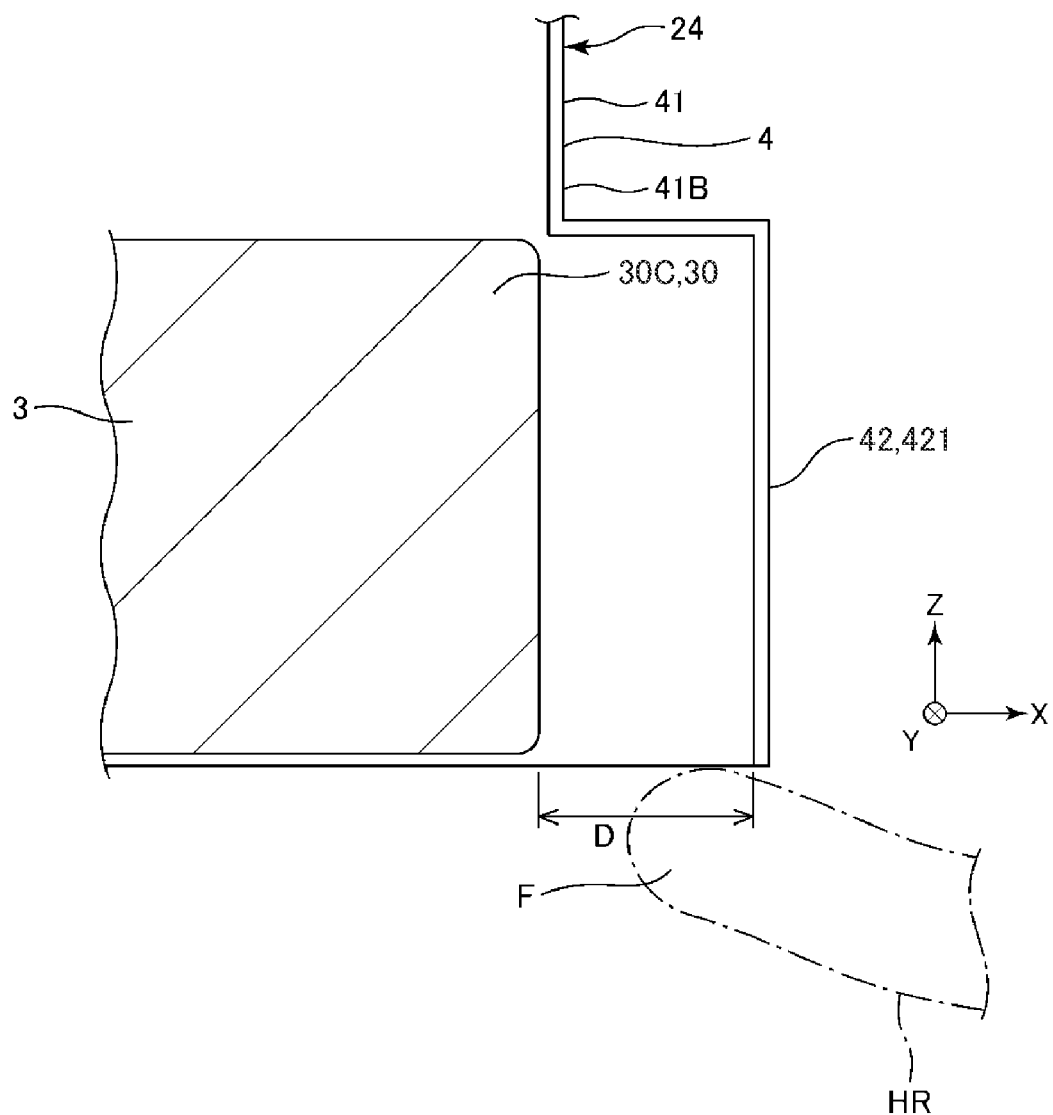
FIG. 5 is a cross-sectional view taken along the line B-B in FIG. 3.
Figure 6:
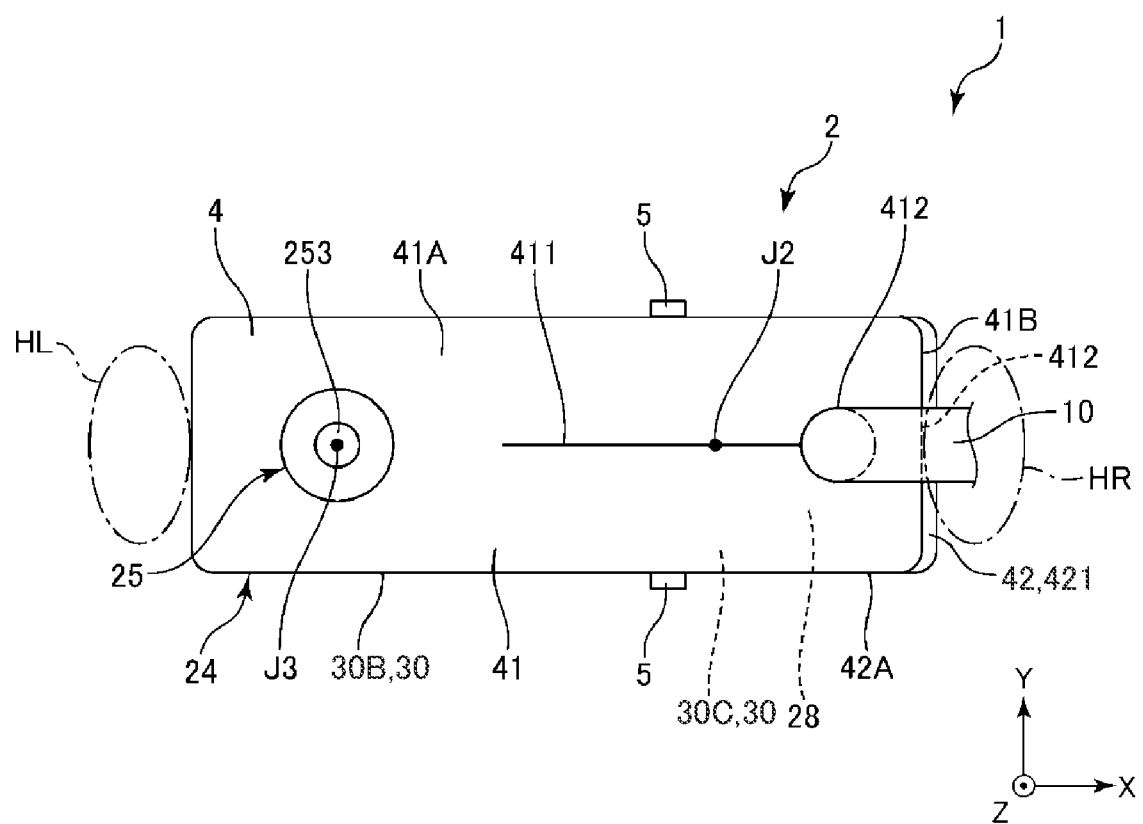
FIG. 6 is a view for explaining a procedure for detaching the cover from the arm base, and is a view of the second arm as viewed from above.
Figure 7:
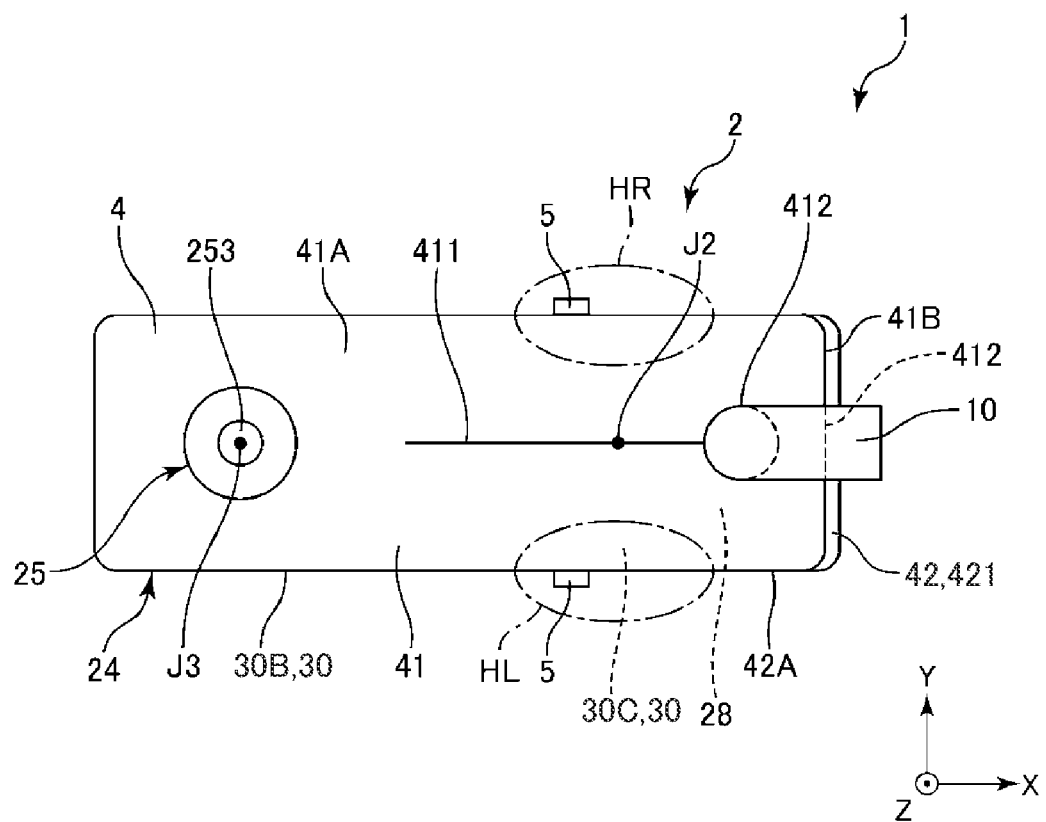
FIG. 7 is a view for explaining the procedure for detaching the cover from the arm base, and is a view of the second arm as viewed from above.
Figure 8:
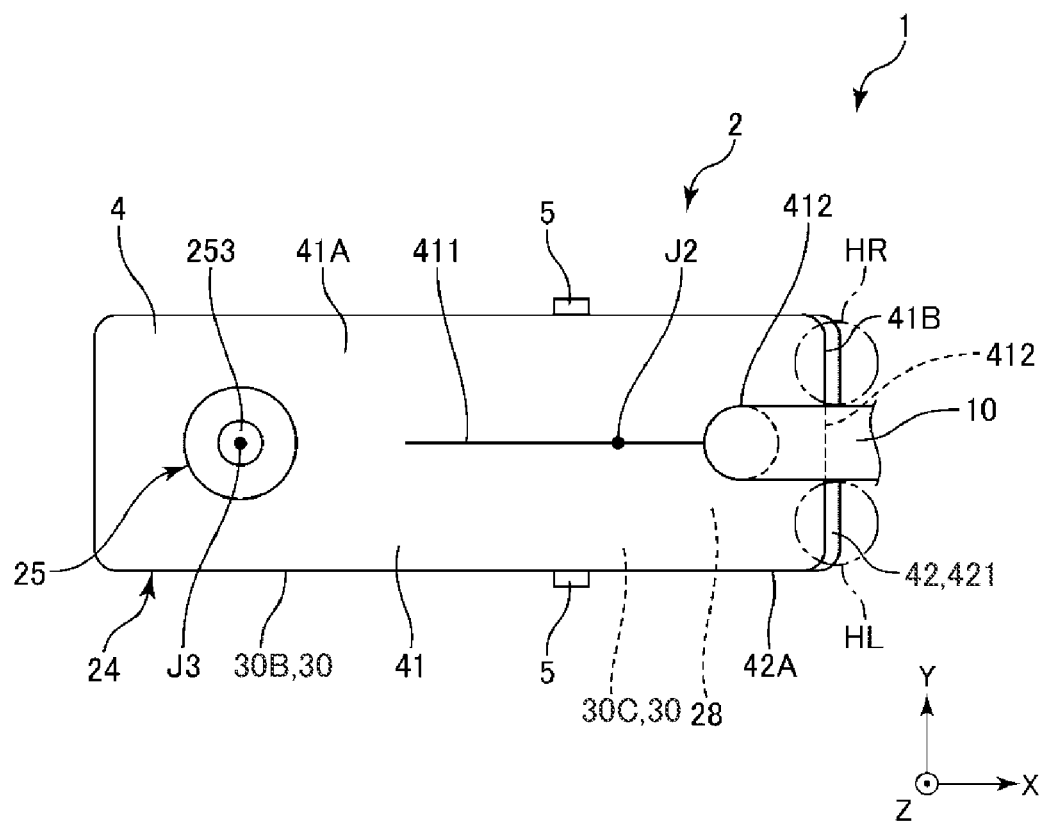
FIG. 8 is a view for explaining the procedure for detaching the cover from the arm base, and is a view of the second arm as viewed from above.

FIG. 1 is an overall view of a robot system according to a first embodiment. FIG. 2 is a side view of a second arm of a robot shown in FIG. 1. FIG. 3 is a view as viewed from the direction of the arrow A in FIG. 2. FIG. 4 is a view as viewed from the direction of the arrow C in FIG. 3. FIG. 5 is a cross-sectional view taken along the line B-B in FIG. 3. FIGS. 6 to 8 are views for explaining a procedure for detaching the cover from the arm base, and are views of the second arm as viewed from above.

In FIG. 1, an X-axis, a Y-axis, and a Z-axis which are three axes orthogonal to each other are set, and the same three axes are shown in FIGS. 2, 3, 4, 5, 6, 7, and 8. Among the three axes, a Z-axis direction indicates a vertical direction, and an X-Y plane indicates a horizontal plane.

The up-down direction in FIGS. 1, 2, 3, and 5 coincides with the vertical direction. An upper side and a lower side in FIGS. 1, 2, 3, and 5 are also referred to as "upper" and "lower", respectively, and for a robot arm 22, a first arm 23, a second arm 24, and the like, the right side in FIGS. 1 and 2, that is, an end portion close to a base 21 is referred to as a base end portion, and the left side, that is, an end portion close to a working head 25 is referred to as a tip end portion. In addition, as shown in FIG. 1, a posture in which the base 21, the first arm 23, and the second arm 24 are positioned on a straight line, that is, positioned along the X-axis is referred to as an initial posture.

In the present specification, the term "vertical" means not only a case where coincident with the vertical, but also a case where slightly inclined with respect to the vertical, for example, within ±10°. In the present specification, "parallel" means not only a case where two objects are parallel to each other, but also a case where two objects are slightly inclined, for example, within ±10° from parallel to each other.

A robot system 1 shown in FIG. 1 includes a robot 2 and a robot control device 9 for controlling the driving of the robot 2.

The robot 2 in the present embodiment is a SCARA robot, and is used, for example, operations such as holding, transporting, assembling, and inspecting a workpiece such as an electronic component. However, the use of the robot 2 is not particularly limited. The robot according to the disclosure may be, for example, a six axes articulated robot, a dual-arm robot, or the like other than the SCARA robot.

As shown in FIG. 1, the robot 2 includes the base 21 and the robot arm 22 rotatably connected to the base 21. The base 21 is fixed to a floor surface 100 parallel to the horizontal plane. The robot control device 9 is installed inside the base 21. Unlike the shown configuration, the robot control device 9 may be installed outside the base 21.

The robot arm 22 includes the first arm 23 whose base end portion is connected to the base 21 and which rotates around a first rotation axis J1 along the vertical direction with respect to the base 21, and the second arm 24 whose base end portion is connected to a tip end portion of the first arm 23 and which rotates around a second rotation axis J2 along the vertical direction with respect to the first arm 23.

The working head 25 is provided at a tip end portion of the second arm 24. The second arm 24 has a shape extending linearly, that is, in the X-axis direction from the second rotation axis J2 to the working head 25. The working head 25 includes a spline nut 251 and a ball screw nut 252 disposed coaxial with each other at the tip end section of the second arm 24, and a spline shaft 253 that is inserted through the spline nut 251 and the ball screw nut 252. The spline shaft 253 is rotatable with respect to the second arm 24 around a third rotation axis J3, which is a central axis of the second arm 24 and extends along the vertical direction, and is movable in the up-down direction along the third rotation axis J3.

The base 21 and the second arm 24 are connected to each other by a flexible pipe 10 such as a cable. A base end portion of the pipe 10 penetrates an upper surface 210 of the base 21 and is positioned in the base 21. A tip end portion of the pipe 10 is positioned inside a cover 4, and penetrates a wide opening section 412 (to be described later) formed in a top surface 41A, which is an upper surface of the second arm 24.

A power supply line, a signal line, and the like extending from the inside of the base 21 to the inside of the second arm 24 are accommodated inside the pipe 10. That is, the power supply line, the signal line, and the like are configured as an insulation-coated cord or a cable obtained by bundling cords. The robot control device 9 installed inside the base 21 and a second joint actuator 28, a first drive mechanism 291, and a second drive mechanism 292 positioned inside the cover 4 are electrically connected to each other by such a cord or cable.

Since the pipe 10 has flexibility, the pipe 10 can sufficiently follow changes in the posture of the robot arm 22 by rotation of the first arm 23 and the rotation of the second arm 24.

An end effector (not shown) is attached to a lower end portion 26 of the spline shaft 253. The end effector is detachable and attachable, and one suitable for the target operation is appropriately selected. Examples of the end effector include a hand or a chuck that grips a workpiece which is an object to be assembled or processed, a tool that performs drilling, grinding, polishing, or the like, and a coating tool such as a spray gun.

The robot 2 includes a first joint actuator 27 that couples the base 21 and the first arm 23 and rotates the first arm 23 around the first rotation axis J1 with respect to the base 21 and the second joint actuator 28 as a joint section that couples the first arm 23 and the second arm 24 and rotates the second arm 24 around the second rotation axis J2 with respect to the first arm 23.

The first arm 23 is connected to the base 21 in a state of being separated from the upper surface 210 of the base 21 by the first joint actuator 27. The second arm 24 is connected to the first arm 23 in a state of being separated from an upper surface 230 of the first arm 23 by a predetermined distance by the second joint actuator 28. The separation distance between a lower end of the second arm 24 and the upper surface 230 is not particularly limited, but is desirably set to such an extent that a finger F of a right hand HR or a left hand HL can enter between them during a detachment operation of the cover 4 (to be described later).

The robot 2 includes the first drive mechanism 291, which rotates the spline nut 251 to rotate the spline shaft 253 around the third rotation axis J3, and the second drive mechanism 292, which rotates the ball screw nut 252 to move up and down the spline shaft 253 in a direction along the third rotation axis J3. The spline shaft 253 is rotated in a predetermined direction around the third rotation axis J3 by the operation of the first drive mechanism 291, and the lower end portion 26 is rotated in the same direction in accordance with the rotation. The spline shaft 253 is moved in the axial direction of the third rotation axis J3 by the operation of the second drive mechanism 292, and the lower end portion 26 is accordingly moved in the same direction, that is, raised or lowered.

Each of the first joint actuator 27, the second joint actuator 28, the first drive mechanism 291, and the second drive mechanism 292 includes a motor, a decelerator, an encoder, and the like (not shown). Each motor and each encoder are electrically connected to the robot control device 9. Each encoder detects rotational position information of the corresponding motor and transmits it to the robot control device 9. Based on the rotational position information of each motor received from each encoder, the robot control device 9 controls the energization conditions of each motor via a motor driver (not shown). As a result, the first arm 23, the second arm 24, and the spline shaft 253 are operated, and the posture of the robot arm 22 is changed over time according to a predetermined program, so that desired work can be performed.

Next, the structure of the second arm 24 will be described.

As shown in FIGS. 1 and 2, the second arm 24 includes an arm base 3, which forms the basic skeleton of the second arm 24, and the cover 4, which is responsible for most of the external shape of the second arm 24. The cover 4 functions as a casing for covering and protecting mounted object of the second arm 24.

The arm base 3 is configured by a rigid body, and supports each part of the mounted objects mounted on the second arm 24, such as the working head 25, the second joint actuator 28, the first drive mechanism 291, and the second drive mechanism 292. The arm base 3 is mainly configured by a plate-like member having a predetermined thickness in the Z-axis direction and having a linear shape, that is, a longitudinal shape extending in the X-axis direction. Further, a portion existing in a direction orthogonal to the longitudinal direction of the arm base 3, that is, in the Y-axis direction is referred to as a side portion. The thickness of the arm base 3 is equal to the length of a side surface 30 of the arm base 3 in the Z-axis direction.

The arm base 3 may have a plate-like composition as a whole and include a hollow portion and ribs for partitioning the hollow portion into a plurality of spaces. Thus, the arm base 3 can achieve both securing of a sufficient strength and weight reduction. In the arm base 3 having such a configuration, the side surface 30 is formed on the outer surface of a side wall formed along the outer periphery of the arm base 3.

Examples of the constituent material of the arm base 3 include various metal materials, various resin materials, in particular, a hard resin material, and various ceramics, and a composite material obtained by arbitrarily combining these materials may be used.

The arm base 3 includes an installation section 31 on which the second joint actuator 28 is installed and fixed, and an installation section 32 on which the working head 25 is installed and fixed.

The installation section 31 is provided at the base end portion of the arm base 3, and is configured by a through hole penetrating in a thickness direction of the arm base 3.

An outer circumferential surface of an output shaft of the decelerator (not shown) of the second joint actuator 28 is fixed to an inner circumferential surface of the installation section 31.

The installation section 32 is provided at the tip end portion of the arm base 3, and is configured by a through hole penetrating in the thickness direction of the arm base 3. An outer circumferential surface of a bearing (not shown) for supporting the spline shaft 253 of the working head 25 is fixed to an inner circumferential surface of the installation section 32.

The cover 4 covers an upper portion of the arm base 3, and has a function of protecting each section of the mounted object mounted inside the second arm 24, such as the working head 25 and the second joint actuator 28. The cover 4 is detachably and attachably mounted on the arm base 3. In the present embodiment, when the cover 4 is mounted on the arm base 3, the cover 4 is fixed via screws 5 as fixing members. This will be described in detail later.

The cover 4 includes a cover main body 41 and a covering section 42 for covering a part of the side surface 30 of the arm base 3.

The cover main body 41 is configured by a housing and covers the upper portion of the arm base 3. The cover main body 41 is configured by, for example, a plate material obtained by molding a resin material into a desired three dimensional shape. It is desirable that the cover main body has elasticity to such an extent that it is slightly deformed when a force is applied. Further, the cover main body 41 may be formed by molding a plate material made of a metal material such as stainless steel or aluminum into a desired three dimensional shape.

As shown in FIGS. 2, 3, 7, and 8, the cover main body 41 includes the top surface 41A and a base end surface 41B, and a slit 411 is formed in both the top surface 41A and the base end surface 41B. The slit 411 is formed along the X-axis direction in the top surface 41A, and is formed from the vicinity of the center portion of the cover main body 41 in the X-axis direction to the base end side. The slit 411 is formed from the upper end to the lower end along the Z-axis direction in the base end surface 41B. The slit 411 is formed from a portion where the pipe 10 penetrates the top surface 41A to the vicinity of the center portion of the base end surface 41B in the Z-axis direction, and includes a wide opening section 412 where the slit is wide. When the cover 4 is to be detached from the arm base 3, the pipe 10 moves along the longitudinal direction of the wide opening section 412. Therefore, the width of the wide opening section 412, that is, the length thereof in the Y-axis direction is substantially equal to the outer diameter of the pipe 10.

The slit 411 and the wide opening section 412 are provided to apply an external force to the cover 4 to deform the cover 4 when the cover 4 is attached to or detached from the arm base 3, thereby facilitating the attachment and the detachment operation. The shapes and arrangement patterns of the slit 411 and the wide opening section 412 are not limited to the configurations shown in the drawings.

The covering section 42 is provided to protrude downward from the cover main body 41, and covers a part of the side surface 30 of the arm base 3 in a state in which the cover 4 is mounted on the arm base 3 (hereinafter, simply referred to as a "mounted state"). In the configuration shown in the drawings, it is provided approximately halfway around so as to cover a portion on the base end side among the side surface 30 of the arm base 3. In other words, the covering section 42 is provided so as to cover a portion corresponding to the second joint actuator 28, which is the joint section of the side surface 30 of the arm base 3, that is, the outer circumferential portion of the second joint actuator 28, and is not provided on the outer circumferential portion of the installation section 32 of the working head 25. As a result, the rigidity of the portion of the cover 4 corresponding to the second joint actuator 28 can be further increased, and the effect of preventing the entry of dust, dirt, and the like into the vicinity of the second joint actuator 28 is also increased. Due to these synergistic effects, the second joint actuator 28 can be effectively protected. Further, it is possible to effectively prevent an operator from installing a peripheral device, wiring, or the like in the portion, and it is possible to prevent the operation of the robot arm 22 from being hindered by the installation.

A portion among the side surface 30 of the arm base 3 closer to the tip end side than the central portion is not covered with the covering section 42, that is, is exposed from the covering section 42. Hereinafter, the outer surface of the covering section 42 is referred to as a first surface 42A, a portion among the side surface 30 exposed from the covering section 42 is referred to as a second surface 30B, and a portion among the side surface 30 covered with the covering section 42 is referred to as a third surface 30C.

The formation position of the covering section 42 is not limited to the above configuration, and for example, in contrast to the above, the covering section 42 may be provided so as to cover a portion on the tip end side among the side surface 30 of the arm base 3, and a portion on the base end side among the side surface 30 may be exposed.

The lower end of the covering section 42 is positioned below the lower end in the thickness direction of the arm base 3. That is, the covering section 42 covers the side surface 30 beyond the lower end of the arm base 3. Accordingly, the effect of covering the side surface 30 is further improved, and the effect of preventing the entry of dust, dirt, and the like, that is, the effect of protecting the inside by the cover 4 is further enhanced. However, without being limited to this configuration, the lower end of the covering section 42 may be positioned at the same position as the lower end of the arm base 3 in the Z-axis direction, or may be positioned above the lower end of the arm base 3 and below the upper end of the arm base 3. In a case where the lower end of the covering section 42 exceeds the lower end of the arm base 3 or is at the same position as the lower end of the arm base 3, and a finger F is easily hooked on the lower end of the covering section 42 without the lower end of the arm base 3 being an obstacle, and thus the detachment operation is easily performed.

As shown in FIG. 2, the distance in the Z-axis direction between the top surface 41A of the cover 4 and the lower end of the cover main body 41, that is, the ratio D2/D1 between the length D1 in the Z-axis direction of the cover main body 41 and the length D2 in the Z-axis direction of the side surface 30 is not particularly limited, but is desirably 0.1 or more and 0.8 or less, and more desirably 0.3 or more and 0.6 or less. Thus, the arm base 3 which is heavier and stronger than the cover main body 41 is shown, and the cover main body 41 which is lighter than the arm base 3 occupies a larger proportion of the external shape of the second arm 24, so that a viewer can have a sense of stability and a quick impression, and the aesthetic property can be enhanced.

In the present embodiment, the top surface 41A of the cover 4, the lower end of the cover main body 41, the lower end of the covering section 42, and the lower end of the arm base 3 extends along a horizontal direction. However, without being limited to this configuration, they may be inclined with respect to the horizontal direction.

As shown in FIG. 4, when the angle of the range in which the covering section 42 exists around the second rotation axis J2 as viewed from the axial direction of the second rotation axis J2 is defined as θ1, θ1 is not particularly limited, but is desirably 10° or more and 300° or less, more desirably 45° or more and 280° or less, and still more desirably 90° or more and 270° or less. Accordingly, the covering section 42 is formed over a wide range, and it is possible to necessarily and sufficiently exhibit the effect obtained by installing the covering section 42, that is, the improvement effect of the operability of the detachment operation and the protection effect of the mounted object of the arm base 3, particularly, the second joint actuator 28.

Note that, in the present embodiment, the covering section 42 is formed continuously in a circumferential direction within the range of the angle θ1, but it is not limited thereto, and a plurality of covering sections 42 may be formed intermittently or intermittently along the circumferential direction.

As shown in FIGS. 4 and 5, the covering section 42 includes, on the base end portion side, a first portion 421, which is not in contact with the side surface 30 of the arm base 3 and is spaced apart from the side surface 30 of the arm base 3 in the mounted state of the cover 4. In the present embodiment, the first portion 421 has a stepped shape protruding toward the base end portion side of the second arm 24, but may spread out downward, that is, may be inclined away from the side surface 30. In this case, the first portion 421 may be referred to as a skirt portion. In addition, since the first portion 421 is particularly suitable for hooking a finger F when the cover 4 is gripped, it is also referred to as a finger hooking section.

By providing such a first portion 421, when the cover 4 is gripped and detached from the arm base 3, as shown in FIG. 5, since the first portion 421 is separated from the side surface 30, a finger F is unlikely to touch the arm base 3, and a finger F easily hooks the first portion 421. A finger F of the hand may be inserted between the first portion 421 and the side surface 30 and a finger F may hook the lower end of the first portion 421. Therefore, it is easy to grip the cover 4, it is easy to lift the cover 4, and it is possible to easily and quickly perform the detachment operation of the cover 4 from the arm base 3 (hereinafter, simply referred to as the "detachment operation"). In the present embodiment, the base end portion side of the covering section 42 is the first portion 421. By this, since the first portion 421 becomes closer to the slit 411 provided in the base end surface 41B, the operator can easily open the slit 411 in the detachment operation (to be described later), and the detachment operation can be performed easily and quickly. Note that the entire covering section 42 may be the first portion 421. That is, the first portion 421 may be formed over the entire circumference of the covering section 42. In this case, the detachment operation can be easily performed by hooking a finger F at any portion of the covering section 42.

The maximum separation distance D of the first portion 421 from the side surface 30 (third surface 30C) is not particularly limited, but is desirably 10 mm or more and 100 mm or less, and more desirably 15 mm or more and 50 mm or less. Thus, by increasing the distance between the first portion 421 and the side surface 30, a finger F is unlikely to contact the arm base 3, and a finger F can be inserted into the gap without excess or deficiency, and the detachment operation can be easily performed. In the case where the first portion 421 has a shape inclined so as to spread downward, the lower end of the first portion 421 is at the maximum separation distance D from the side surface 30 (the third surface 30C).

The first portion 421 may have a shape in which the separation distance with the side surface 30 of the arm base 3 increases continuously or stepwise toward the lower end of the covering section 42. That is, the first portion 421 may be provided to be inclined so as to spread downward. Thus, as shown in FIG. 5, when a finger F is inserted between the first portion 421 and the side surface 30 (the third surface 30C), since the separation distance becomes narrower toward the upper side, the insertion depth of a finger F can be restricted, and the cover 4 can be more easily gripped.

When the separation distance between the first portion 421 and the side surface 30 (the third surface 30C) of the arm base 3 continuously increases toward the lower end of the covering section 42, an inclination angle θ3 of the first portion 421 with respect to the side surface 30 of the arm base 3 is not particularly limited, but is desirably 10° or more and 70° or less, and more desirably 15° or more and 45° or less. By this, it is possible to more reliably exhibit the above described effect, and it is possible to prevent the covering section 42 from becoming an obstacle when the cover 4 is attached to and detached from the arm base 3.

The inclination angle θ3 is not limited to being constant from the upper end to the lower end of the first portion 421, and may include a portion where the inclination angle θ3 changes at an intermediate location.

The present disclosure is not limited to the above described configuration, and the separation distance between the first portion 421 and the side surface 30 (the third surface 30C) of the arm base 3 may increase stepwise toward the lower end of the covering section 42.

Further, the covering section 42 may be provided in parallel with respect to the side surface 30 (the third surface 30C) of the arm base 3 at a predetermined interval.

The separation distance between the first portion 421 and the third surface 30C, in particular, the maximum separation distance D and the inclination angle θ3 may be constant along the circumferential direction of the covering section 42, or may have partially different portions.

Further, the inner surface of the covering section 42 may be in surface contact with the side surface 30 (third surface 30C) of the arm base 3. That is, the first portion 421 may be omitted.

As shown in FIG. 4, when the angle of the range in which the first portion 421 exists around the second rotation axis J2 as viewed from the axial direction of the second rotation axis J2 is defined as θ2, θ2 is not particularly limited, but is desirably 5° or more and 300° or less, and more desirably 30° or more and 270° or less. By this, the first portion 421 is formed over a relatively wide range, and can be used for the detachment operation, so that the above described effects can be exhibited as necessary and as sufficient.

Note that, in the present embodiment, the first portion 421 is formed continuously in the circumferential direction within the range of the angle θ2, but it is not limited thereto, and a plurality of first portions 421 may be formed intermittently or intermittently along the circumferential direction.

When the relationship between θ2 and θ1 is considered, θ2/θ1 is desirably 0.1 or more and 1 or less, more desirably 0.2 or more and 0.8 or less, and still more desirably 0.3 or more and 0.6 or less. As a result, the range in which the first portion 421 exists can be secured in a necessary and sufficient manner, and the effect of preventing entry of dust, dirt, and the like, that is, the effect of protecting the inside by the cover 4, and the effect of improving the operability of the detachment operation both can be achieved in a well-balanced manner. In the present embodiment, as shown in FIG. 4, θ2/θ1=0.33.

As shown in FIGS. 1 to 4, 6, 7, and 8, the cover 4 is fixed to the arm base 3 by the screws 5, which are fixing members, in a state where the cover 4 is mounted on the arm base 3. In particular, it is fixed to the side surface 30 of the arm base 3. As a result, the cover 4 can be reliably and stably fixed with respect to the arm base 3, and even when vibration, impact, other external force, or the like is applied during work, the cover 4 can be prevented from falling off. The screw 5 is inserted and screwed into a through hole (not shown) formed in the covering section 42 and a screw hole formed in the side surface 30 (third surface 30C) of the arm base 3, thereby fixing the covering section 42 to the arm base 3. Thus, the cover 4 can be fixed to the arm base 3 by a simple method of forming a screw hole in the side surface 30 (the third surface 30C) of the arm base 3.

In the shown configuration, as a configuration of screwing to the covering section 42 without the first portion 421, the covering section 42 on the side portion of the arm base 3 is fastened by screw, but the covering section 42 with the first portion 421 may be fastened by screw. In the case where the first portion 421 is fastened by screw, fastening by screw can be easily and reliably performed as described above by using a relatively long screw 5 or by fastening the covering section 42 by screw at a position higher than the first portion 421. In particular, it is desirable to perform fastening by screw as described above when the entire covering section 42 is the first portion 421.

The portion to be fastened by the screw 5, that is, the fixing portion, may be one or a plurality of portions, but a plurality of portions are desirable in order to make the fixing more reliable. In the present embodiment, the locations that are fastened by the screws 5 are a total of two places on the plus side in the Y-axis direction and the minus side in the Y-axis direction of the third surface 30C among the side surface 30, but the present disclosure is not limited thereto, and one or two or more places may be formed on the base end surface of the third surface 30C, that is, the surface on the plus side in the X-axis direction.

Alternatively, only the covering section 42 may be fastened by screw to the arm base 3, only the cover main body 41 may be fastened by screw to the arm base 3, or both the cover main body 41 and the covering section 42 may be fastened by screw to the arm base 3.

Although the case where the screw 5 is used as the fixing member has been described, the present disclosure is not limited thereto, and fixing members other than the screw 5, for example, a bis, a bolt and a nut, a hook, a clip, a tightening band, a magnet, or the like may be used, or fixing may be performed by a method such as caulking or fitting.

Next, the procedure of the detachment operation for detaching the cover 4 from the arm base 3 will be described.
Procedure 1

In the mounted state of the cover 4, first, all the screws are removed using a screwdriver (not shown).
Procedure 2

Next, as shown in FIG. 6, for example, the covering section 42 is gripped with the right hand HR, and the tip end portion of the cover main body 41 is gripped with the left hand HL. At this time, as shown in FIG. 5, a finger F of the right hand HR is inserted into and hooks the inside of the first portion 421 of the covering section 42.

Procedure 3

Next, the tip end portion of the cover main body 41 is lifted upward with the left hand HL, and the covering section 42 is lifted upward with the right hand HR while a finger F is hooked on the first portion 421. When the cover 4 is lifted, the pipe 10 moves in the wide opening section 412 of the slit 411 in its longitudinal direction.
Procedure 4

Next, while maintaining the state in which the cover 4 is lifted in the procedure 3, as shown in FIGS. 7 and 8, the left hand HL is changed to grip the portion of the covering section 42 on the Y-axis minus side with respect to the slit 411, and the right hand HR is changed to grip the portion of the covering section 42 on the Y-axis plus side with respect to the slit 411. At this time, as shown in FIG. 7, the left hand HL may grip the side portion on the Y-axis minus side of the covering section 42, and the right hand HR may grip the side portion on the Y-axis plus side of the covering section 42, or as shown in FIG. 8, the left hand HL may grip the first portion 421 on the Y-axis minus side of the slit 411, which is the base end portion side of the covering section 42, and the right hand HR may grip the first portion 421 on the Y-axis plus side. Then, a force is applied to the cover main body 41 so that the portion of the cover main body 41 on the minus side of the Y axis and the portion on the plus side of the Y axis separate from each other, that is, the slit 411 is opened, and in the state where the slit 411 is open, the cover 4 is slightly lifted so that the pipe 10 is detached from the slit 411.
Procedure 5

Next, the cover 4 is further lifted upward so as to remove the spline shaft 253 from the cover 4.

The cover 4 can be detached from the arm base 3 through such procedures 1 to 5. In the procedures 1 to 5, the use of left and right hands may be reversed.

Here, when the covering section 42 is omitted, it is difficult to hold the lower end of the cover 4, or it is difficult to know where to hold. Since the covering section 42 is provided in the robot 2, the operator can easily recognize the covering section 42, particularly the first portion 421, which is a portion convenient for hooking a finger F, and can easily hook a finger F on the first portion 421. As a result, the operator can stably grip the cover 4. Therefore, the cover 4 can be easily and quickly detachment operation. After the cover 4 is detached, maintenance such as inspection, repair, and replacement of parts can be performed on the mounted object on the arm base 3 and the inside of the cover 4.

As described above, the robot 2 includes the base 21, the first arm 23 rotatably connected to the base 21 around the first rotation axis J1; and the second arm 24 rotatably connected to the first arm 23 around the second rotation axis J2 parallel to the first rotation axis J1, wherein the second arm 24 includes the arm base 3 and the cover 4 configured to attach to and detach from the arm base 3 and the cover 4 includes the cover main body 41 that covers the upper portion of the arm base 3 and the covering section 42 that protrudes downward from the cover main body 41 and that covers a portion of the side surface 30 of the arm base 3.

Accordingly, when the cover 4 is detached from the arm base 3, the cover 4 can be easily gripped, and thus a detachment operation of the cover 4 can be easily and quickly performed.

Also, the robot 2, further includes the screw 5 as a fixing member for fixing the covering section 42 to the side surface 30 of the arm base 3.

Thus, the cover 4 can be reliably and stably fixed with respect to the arm base 3.

Also, the robot 2, further includes the second joint actuator 28 that is the joint section that rotatably connects the second arm 24 to the first arm 23 around the second rotation axis J2, wherein the covering section 42 covers the portion of the side surface 30 of the arm base 3 corresponding to the second joint actuator 28.

As a result, the rigidity of the portion of the cover 4 corresponding to the second joint actuator 28 can be increased, and the effect of preventing the entry of dust, dirt, and the like into the vicinity of the second joint actuator 28 is also increased. Due to these synergistic effects, the second joint actuator 28 can be effectively protected.

In addition, the covering section 42 includes the first portion 421 separated from the side surface 30 of the arm base 3.

Thus, when the cover 4 is detached from the arm base 3, as shown in FIG. 5, a finger F can be inserted between the first portion 421 and the side surface 30, and a finger F can be hooked on the lower end of the first portion 421. Therefore, the cover 4 be easily gripped, and can be easily and quickly detachment operation.

In addition, the first portion 421 has a shape in which the separation distance from the side surface 30 of the arm base 3 increases toward the lower end of the covering section 42.

Thus, as shown in FIG. 5, when a finger F is inserted between the first portion 421 and the side surface 30 (the third surface 30C), since the clearance on the upper side is narrowed, the insertion depth of a finger F can be restricted, and the cover 4 can be easily gripped. Therefore, the cover 4 can be detached more easily and quickly.

As shown in FIG. 4, θ2/θ1 is equal to or greater than 0.1 and equal to or less than 1, when an angle of the range in which the covering section 42 exists around the second rotation axis J2 is θ1, and an angle of the range in which the first portion 421 exists around the second rotation axis J2 is θ2, as viewed from the axial direction of the second rotation axis J2.

Accordingly, it is possible to secure a necessary and sufficient range in which the first portion 421 is present, and it is possible to more reliably exhibit the above described effect. In particular, both the internal protection effect by the cover 4 and the operability improvement effect of the detachment operation can be achieved in a well-balanced manner.

In such a robot 2, the first surface 42A, which is the outer surface of the covering section 42, and the second surface 30B, which, among the side surface 30 of the arm base 3, is not covered with the covering section 42, are different from each other in at least one of the wavelength and intensity of reflection light obtained by reflecting the visible lights incident thereon. Accordingly, the distinguishability of the boundary between the first surface 42A and the second surface 30B is secured, and the arm base 3 and the covering section 42 can be easily visually distinguished from each other. Therefore, when the cover 4 to be detached from the arm base 3, the covering section 42 is easily recognized. As a result, the cover 4 can be easily and quickly detached by immediately holding the covering section 42 and performing the above described operation. This will be described in detail below.

Among the wavelength and the intensity of the reflection light on the first surface 42A and the second surface 30B will be described, a case where the wavelength are mainly different will be described as a case 1, a case where the intensity are mainly different will be described as a case 2, and a case where both the wavelength and the intensity are different as a case 3.

Case 1

For the case where the wavelengths of reflection light mainly differ between the first surface 42A and the second surface 30B, an example of at least one of hue, saturation, and lightness differing between the first surface 42A and the second surface 30B can be raised.

In any of the case where hues are different, the case where saturations are different, and the case where lightness are different, the above described effect can be obtained as long as a color difference ΔE is different between the first surface 42A and the second surface 30B when the reflection light is measured using a color difference meter. The color difference ΔE is desirably 5.0 or more, and more desirably 12.0 or more. As a result, the above mentioned effect can be exhibited more reliably.

Both of the first surface 42A and the second surface 30B may be chromatic color, the first surface 42A may be chromatic color and the second surface 30B may be achromatic color, the first surface 42A may be achromatic color and the second surface 30B may be chromatic color, or both of the first surface 42A and the second surface 30B may be achromatic color.

The case where both the first surface 42A and the second surface 30B are chromatic color, the case where the first surface 42A is a chromatic color and the second surface 30B is an achromatic color, and the case where the first surface 42A is an achromatic color and the second surface 30B is a chromatic color, the design of the entire robot 2 can be made gorgeous, and can be made relatively conspicuous to give an impression of presence.

In a case where both the first surface 42A and the second surface 30B are achromatic color, the design of the entire robot 2 is monotone and can be made chic, and can be made to have a quiet color tone that is not too conspicuous.

When both the first surface 42A and the second surface 30B are achromatic color, only the lightness is different. In this case, the difference in Munsell lightness value measured with a lightness meter is desirably 2 or more, and more desirably 4 or more. As a result, the above mentioned effect can be exhibited more remarkably.

Such the case 1 is produced by a method in which constituent materials having different colors are used for the arm base 3 and the covering section 42, a method in which a dye or a pigment is blended into at least one of the constituent material itself of the arm base 3 or the constituent material itself of the covering section 42, and coloring is performed, a method in which a coating material such as a coloring coating material is applied to at least one of the first surface 42A and the second surface 30B, a method in which a film such as a coloring film or a colored transparent film is adhered to at least one of the first surface 42A and the second surface 30B, or a method in which these methods are arbitrarily combined.

The constituent material of the arm base 3, the constituent material of the covering section 42, the paint, and the film may contain a fluorescent substance, a luminescent substance, metal powder, or the like.

Case 2

For the case where the intensities of reflection light mainly differ between the first surface 42A and the second surface 30B, an example of hue, saturation, and lightness being substantially the same and glossiness of the first surface 42A and the second surface 30B differing can be raised.

The first surface 42A may have a higher glossiness than the second surface 30B, or the second surface 30B may have a higher glossiness than the first surface 42A.

The glossiness can be measured with a glossmeter.

As a method of making the glossiness different between the first surface 42A and the second surface 30B, a method of making surface roughness different, a method of making visible light absorptivity of the constituent material different, and the like can be raised as examples.

Such a case 2 can be realized by a method in which the surface of either one of the first surface 42A and the second surface 30B is roughened or embossed by sand blast, shot blast, satin finish, hairline finish, chemical treatment, or the like, a method in which the surface of either one of the first surface 42A and the second surface 30B is polished, glossed, or mirror finish, a method in which the surface of either one of the first surface 42A and the second surface 30B is clear-coated or matte-coated, a method in which the surface of the first surface 42A and the second surface 30B is light-transmitting or light-non-transmitting films having different degrees of glossiness are attached, a method in which these methods are arbitrarily combined, or the like.

Case 3

For the case where the both the wavelength and the intensity of the reflection light are different between the first surface 42A and the second surface 30B, an example of at least one of hue, saturation, and lightness differ and the glossiness differ between the first surface 42A and the second surface 30B can be raised. That is, case 3 is a combination of case 1 and case 2.

Case 3 includes a case where the first surface 42A is metallic color and the second surface 30B is chromatic color, a case where the first surface 42A is metallic color and the second surface 30B is achromatic color, a case where the first surface 42A is chromatic color and the second surface 30B is metallic color, and a case where the first surface 42A is achromatic color and the second surface 30B is metallic color. Further, a case where the first surface 42A and the second surface 30B have different metallic colors is also included.

Examples of the metallic color include gold, silver, copper, and pink gold. In the case of the metallic color, there is an advantage that it is easy to vary the intensity of the reflection light, that is, the glossiness by setting the property of the front face such as the surface roughness.

As described above, since the first surface 42A and the second surface 30B are different from each other in at least one of the wavelength and the intensity of the reflection light, the arm base 3 and the covering section 42 can be visually easily distinguished from each other. Therefore, at the time of the detachment operation of the cover 4, the covering section 42 (the first surface 42A) can be distinguished and easily visually recognized separately from the side surface 30 (the second surface 30B) of the arm base 3. That is, first, when the fixation of the cover 4 is released, it is possible to easily visually recognize the screwed portion by the screw 5 formed in the covering section 42, and then, when the cover 4 is gripped, it is possible to easily visually recognize the covering section 42 which is a portion where a finger F is hooked. In addition, the cover 4 can be detached more easily and quickly by a synergistic effect with the effect of providing the covering section 42 as described above.

Further, among the side surface 30 of the arm base 3, the second surface 30B which is not covered with the covering section 42 and the third surface 30C which is covered with the covering section 42 desirably have the same wavelength and intensity of reflection light. Since the third surface 30C is covered with the covering section 42 and cannot be seen, there is no difference in the distinguishability of the boundary between the first surface 42A and the second surface 30B even if the second surface 30B and the third surface 30C have the same color or different colors. Further, by making the second surface 30B and the third surface 30C have the same color, that is, the same wavelength and intensity of the reflection light, the entire side surface 30 of the arm base 3 can be integrally configured in the same color, the configuration of the arm base 3 can be simplified, and the arm base 3 can be easily manufactured.

Note that the first surface 42A and the second surface 30B are not limited to the case of a single color, and may be provided with a marker or a pattern indicating the boundary or the portion to be gripped. In addition, the first surface 42A and the second surface 30B may have different tactile sensation and thermal conductivity. In this case, for example, even in a relatively dark room, it is possible to easily, quickly, and reliably grasp the portion of the cover 4 to be gripped.

Hereinabove, the robot according to the disclosure has been described based on the embodiments shown in the drawings, but the disclosure is not limited thereto, and the configuration of each section can be replaced with an arbitrary configuration having the same function. Further, the robot according to the present disclosure may be provided with other arbitrary components.

What is claimed is:

1. A robot comprising:
   a base;
   a first arm rotatably connected to the base and rotatable around a first rotation axis; and
   a second arm rotatably connected to the first arm and rotatable around a second rotation axis parallel to the first rotation axis, the second arm extending along a first direction, the second arm having first and second ends opposite to each other along the first direction, wherein
   the second arm includes a working head, an arm base, and a cover configured to attach to and detach from the arm base,
   the working head is disposed at a first position closer to the first end than the second end of the second arm,
   the second rotation axis is located at a second position closer to the second end than the first end of the second arm,
   the cover includes:
      a cover main body that covers an upper portion of the second arm; and
      a covering section that downwardly continuously extends from the cover main body and that covers a side surface of the arm base at the second end of the second arm,
   a bottom of the covering section downwardly extends further than a bottom of the arm base, and
   the side surface of the arm base at the second end of the second arm is spaced apart from the covering section along the first direction without having another structure therebetween.

2. The robot according to claim 1, further comprising:
   a fixing member for fixing the covering section to the side surface of the arm base.

3. The robot according to claim 1, further comprising:
   a joint section that rotatably connects the second arm and the first arm to rotate the second arm around the second rotation axis, wherein
   the covering section covers a portion of the joint section.

4. The robot according to claim 1, wherein
the covering section includes a first portion separated from the side surface of the arm base at the second end of the second arm.

5. The robot according to claim 4, wherein
a top part of the first portion is spaced apart from the side surface of the arm base by a first distance, and a bottom part of the first portion is spaced apart from the side surface of the arm base by a second distance, and
the second distance is larger than the first distance.

6. The robot according to claim 4, wherein
$\theta 2/\theta 1$ is in a range of 0.1 to 1, where, as viewed from an axial direction of the second rotation axis, $\theta 1$ is an angle range in which the covering section exists around the second rotation axis and $\theta 2$ is an angle range in which the first portion exists around the second rotation axis.

* * * * *